(12) United States Patent
Steinke et al.

(10) Patent No.: US 7,614,340 B2
(45) Date of Patent: Nov. 10, 2009

(54) COMPOSITE PISTON HOUSING FOR AIRCRAFT BRAKES

(75) Inventors: Douglas J. Steinke, South Bend, IN (US); Charles A. Parker, Granger, IN (US); Stanley W. May, Mishawaka, IN (US); Manuel G. Koucouthakis, Granger, IN (US)

(73) Assignee: Honeywell International Inc., Morristown, NJ (US)

( * ) Notice: Subject to any disclaimer, the term of this patent is extended or adjusted under 35 U.S.C. 154(b) by 449 days.

(21) Appl. No.: 11/704,239

(22) Filed: Feb. 9, 2007

(65) Prior Publication Data

US 2008/0191092 A1  Aug. 14, 2008

(51) Int. Cl.
*F16J 10/02* (2006.01)
*F01B 1/00* (2006.01)

(52) U.S. Cl. ........................ 92/169.2; 92/146

(58) Field of Classification Search ............. 92/146, 92/147, 148, 169.1, 169.2
See application file for complete search history.

(56) References Cited

U.S. PATENT DOCUMENTS

| | | | |
|---|---|---|---|
| 3,312,313 A | 4/1967 | Moyer | |
| 3,880,092 A | 4/1975 | Seeber et al. | |
| 4,216,634 A | 8/1980 | Binder | |
| 4,381,908 A | 5/1983 | Roth | |
| 4,703,837 A | 11/1987 | Guichard | |
| 5,205,382 A * | 4/1993 | Edmisten | 92/129 |
| 5,228,543 A * | 7/1993 | Heidenreich | 92/146 |
| 5,234,080 A | 8/1993 | Pantale | |
| 5,433,300 A | 7/1995 | Barlow et al. | |
| 5,632,940 A | 5/1997 | Whatley | |
| 5,826,686 A | 10/1998 | Rike | |
| 5,887,684 A | 3/1999 | Doll et al. | |
| 6,146,727 A | 11/2000 | Dannels | |
| 6,532,637 B1 | 3/2003 | Niespodziany et al. | |
| 6,702,068 B1 | 3/2004 | Riebe | |
| 6,719,104 B1 | 4/2004 | Wemple et al. | |
| 6,889,436 B2 | 5/2005 | Derrick | |
| 2005/0217950 A1 | 10/2005 | Jolley, Jr. et al. | |

FOREIGN PATENT DOCUMENTS

| | | |
|---|---|---|
| DE | 1505600 | 11/1970 |
| DE | 4430957 A1 | 3/1996 |
| JP | 62072934 | 4/1987 |
| WO | WO 02/27049 A2 | 4/2002 |
| WO | WO 02/27049 A3 | 4/2002 |

* cited by examiner

*Primary Examiner*—Michael Leslie
(74) *Attorney, Agent, or Firm*—Birch, Stewart, Kolasch & Birch, LLP

(57) ABSTRACT

An aircraft brake piston housing (10) has a composite body (14) including a plurality of fibers embedded in a matrix, the body (14) including a central bore (18) and a plurality of circumferentially disposed openings (23) surrounding the bore (18), at least some of the circumferentially disposed openings (23) being configured to receive a brake piston (26), and a frame (12) embedded in the composite body (14) and formed from a material different than the matrix. Also a method of forming such a brake piston housing.

20 Claims, 6 Drawing Sheets

COMPOSITE PISTON HOUSING FOR AIRCRAFT BRAKES

FIELD OF THE INVENTION

The present invention is directed toward a composite housing for aircraft brake pistons and toward a method of forming same, and, more specifically, toward a composite housing having an embedded frame, the housing defining openings for receiving brake pistons, and toward a method of forming same.

BACKGROUND OF THE INVENTION

FIG. 8 illustrates a portion of a typical aircraft brake system 200 that includes a plurality of spaced, disk shaped stators 202 mounted on a torque tube 204 and a plurality of disk shaped rotors 206 that rotate with an aircraft wheel 207 and extend into the spaces between the stators 202. Pistons 208 are mounted on a piston housing 210 which is connected to the torque tube 204 by bolts 205. The pistons 208 apply pressure against a pressure plate 212 (the first stator in the stack of rotors and stators) to compress the stack, and the friction generated as the rotors are pressed into contact with the stators slows the aircraft wheel.

Each of the pistons 208 is mounted in a piston chamber 214 and biased into a retracted position relative to pressure plate 212 with springs 216. Hydraulic fluid flows into piston housing 210 through fitting 218 and into internal channels 220 formed in the aluminum piston housing 210 between the piston chambers 214. Thus, when pressure is applied to the fluid by an external source, (not shown) the pistons 208 are driven against the pressure plate 212; when the hydraulic pressure drops, the pistons 208 are retracted by springs 216.

It is known to replace various metal aircraft components with lightweight composite materials to reduce aircraft weight. Such weight reductions are generally desirable as they either save fuel or increase the carrying capacity of the aircraft. However, brake assemblies are subject to high temperatures and stresses. The rotors and stators can reach 1500° F. during a landing, and the hydraulic fluid pressure in the piston chambers and connecting hydraulic fluid lines can reach thousands of psi. Moreover, it is desirable to provide a suitably rigid piston housing because deformations of the piston housing can misalign the pistons 208 and piston chambers 214 and cause the pistons to bind, hydraulic fluid to leak, and/or the brake system to operate improperly. Aircraft brake assemblies, therefore, have not heretofore appeared to present good opportunities for weight reduction through the use of lightweight composite materials which generally cannot satisfy all the above requirements. It would, however, be desirable to reduce the weight of aircraft brake assemblies using composite materials if the aforementioned problems could be addressed.

SUMMARY OF THE INVENTION

These and other problems are addressed by the present invention, a first aspect of which comprises an aircraft brake piston housing that includes a composite body having a plurality of fibers embedded in a matrix. The body includes a central bore and a plurality of circumferentially disposed openings surrounding the bore, at least some of the circumferentially disposed openings being configured to receive a brake piston. A frame formed from a material different than the matrix is embedded in the composite body.

Another aspect of the invention comprises a method of forming a brake piston housing that includes steps of providing a frame defining at least a central opening and a plurality of additional openings circumferentially disposed around the central opening and placing the frame in a mold. Reinforcing fibers are also placed in the mold and the mold is filled with a composite matrix material to embed the frame and reinforcing fibers in the composite matrix material.

Yet another aspect of the invention is an aircraft brake piston housing that includes a composite body having a plurality of fibers embedded in a matrix, the body including a central bore and a plurality of circumferentially disposed openings surrounding the bore. A first brake piston is mounted in a first one of the circumferentially disposed openings and a second brake piston is mounted in a second one of the plurality of circumferentially disposed openings, and a frame formed from a material different than the matrix is embedded in the composite body.

BRIEF DESCRIPTION OF THE DRAWINGS

These and other aspects and features of embodiments of the present invention will be better understood after a reading of the following detailed description in connection with the attached drawings wherein.

DETAILED DESCRIPTION

Figure 1:
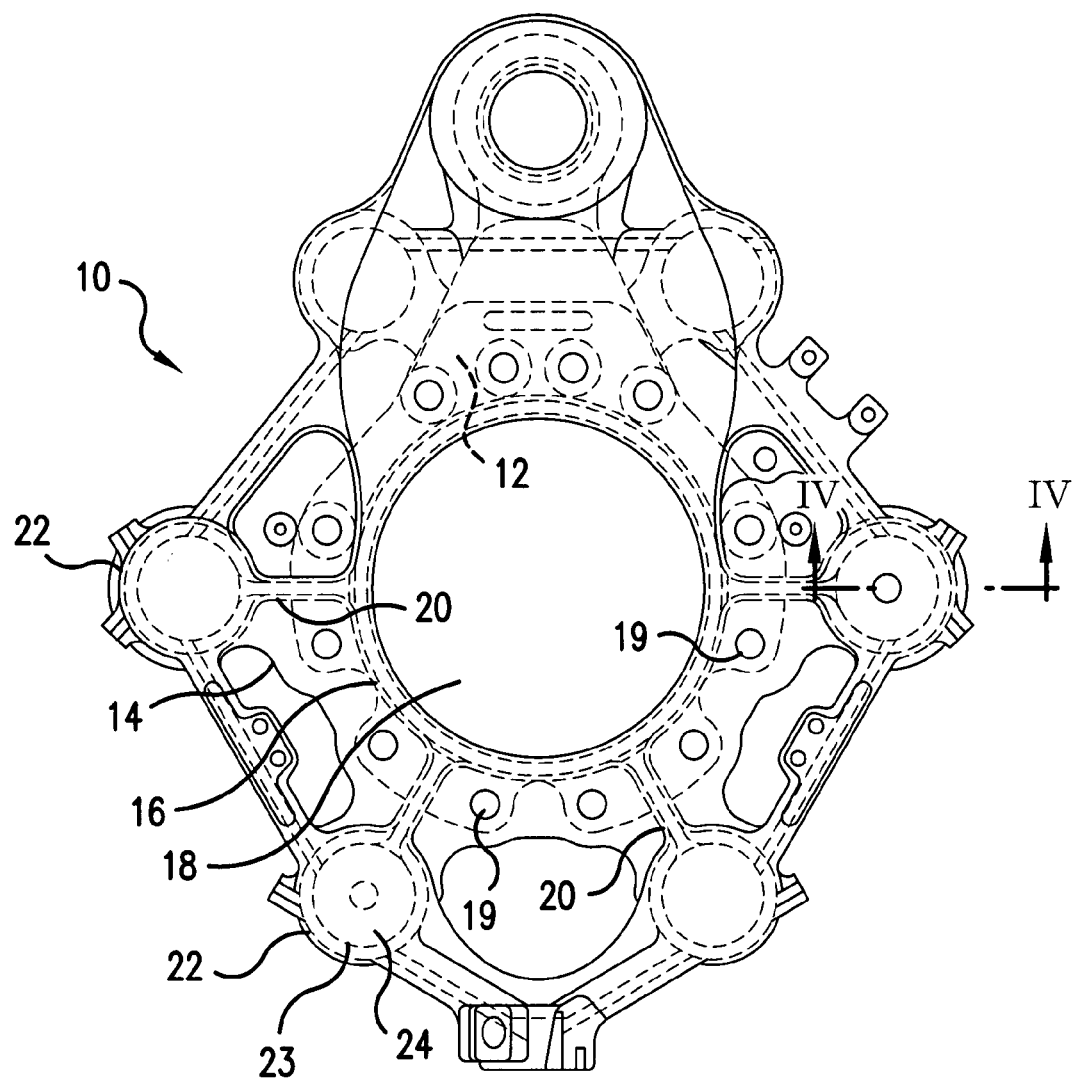
FIG. 1 is an elevational view of an aircraft brake piston housing including a frame embedded in a composite body according to an embodiment of the present invention.
Figure 2:
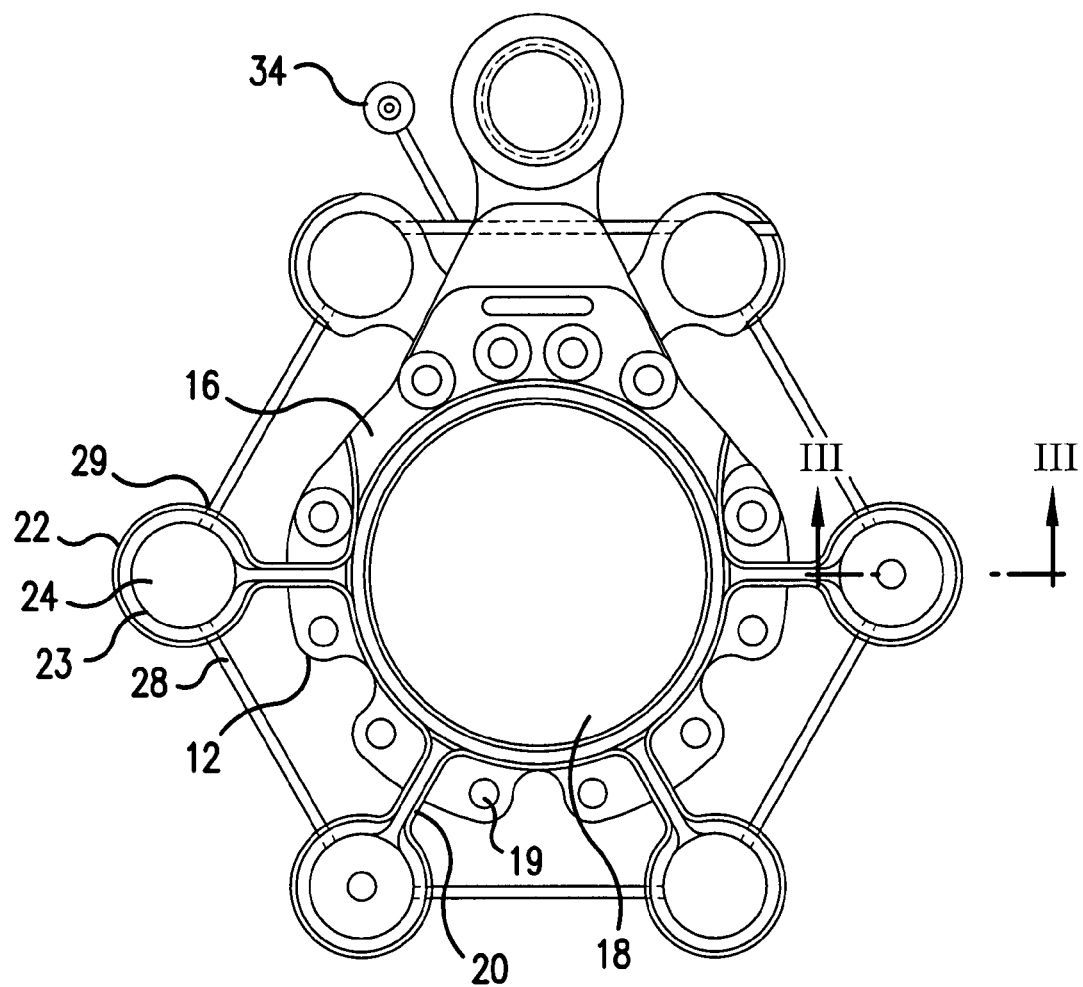
FIG. 2 is an elevational view of the frame, piston cups and hydraulic lines of the piston housing of FIG. 1.

Referring now to the drawings, wherein the showings are for purposes of illustrating preferred embodiments of the invention only and not for the purpose of limiting same, FIG. 1 illustrates a brake piston housing 10 comprising a frame 12 embedded in a body 14 formed of a composite material which may comprise reinforcing fibers in a resin. The resin may comprise, for example, an epoxy or phenolic resin, and the fibers may comprise carbon, titanium or nylon-66 (Kevlar®). Frame 12 is illustrated in FIG. 2 without the surrounding composite material and may be formed, for example, from aluminum or other rigid material. Frame 12 includes a central body portion 16 defining a central opening 18, a plurality of bolt holes 19, and a plurality of arms 20 extending from the central body portion 16 which arms terminate in rings or ring members 22. The rings 22 define openings 23 adapted to receive cylindrical inserts 24 which in turn contain a brake piston 26 (illustrated in FIGS. 3 and 4) and a tension spring 28 that holds piston 26 in a retracted position within cylindrical insert 24 under normal circumstances. Each of the cylindrical inserts 24 includes at least one opening 29 in a wall thereof to which a hydraulic fluid line 28 is connected; many of the cylindrical inserts 24 will include a pair of openings 29, a first for receiving hydraulic fluid and a second for conveying hydraulic fluid and/or pressure to adjoining cylindrical inserts 24 for operating the brake pistons 26 mounted therein. Hydraulic fluid is supplied to the hydraulic fluid lines 28 and brake pistons 26 via fitting 34.

Figure 3:
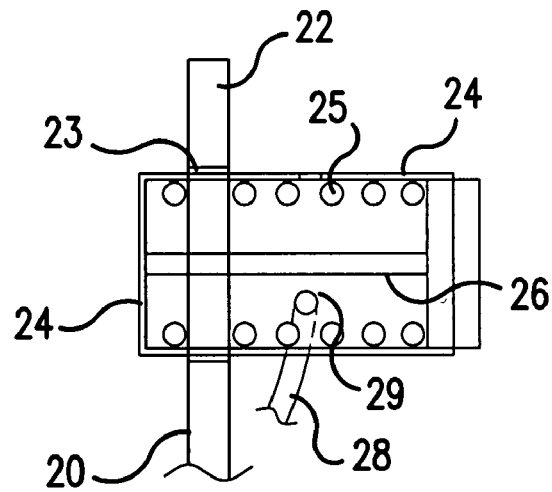
FIG. 3 is a sectional elevational view taken along line III-III of FIG. 2.
Figure 4:
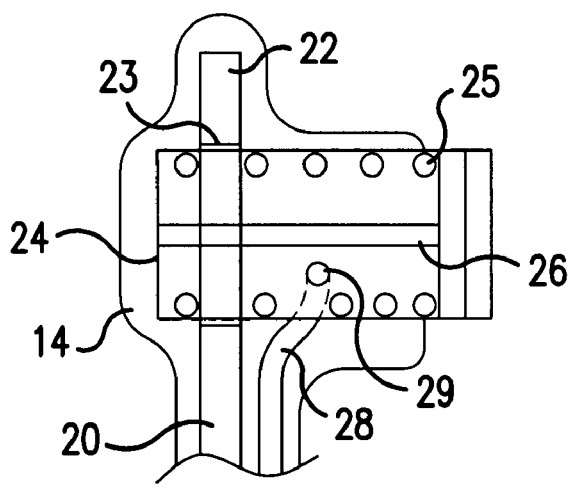
FIG. 4 is a sectional elevational view taken along line IV-IV of FIG. 1.

FIG. 3 is a sectional view of one of arms 20 without a covering of composite material and FIG. 4 is a sectional view of the same arm 20 covered with a body 13 of composite material. As should be apparent from a consideration of FIGS. 2 and 3 together, cylindrical inserts 24 project into the page as viewed in FIG. 2, and hydraulic fluid lines 28 connect the cylindrical inserts 24 in a plane spaced from central body portion 16 and arms 20. The cylindrical inserts 24 may include threading (not shown) on an outer surface complementary to threading (not shown) on the inside of rings 22 to allow the cylindrical inserts to be securely connected to frame 12 before composite body 14 is formed around the frame. The cylindrical inserts 24 may be mechanically connected to frame 12 using other arrangements without exceeding the scope of this invention.

Figure 5:
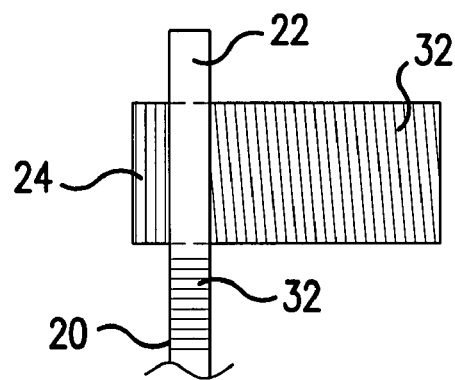
FIG. 5 is a side elevational view of an alternate embodiment of the invention wherein a fiber is wrapped around a portion of the frame.
Figure 6:
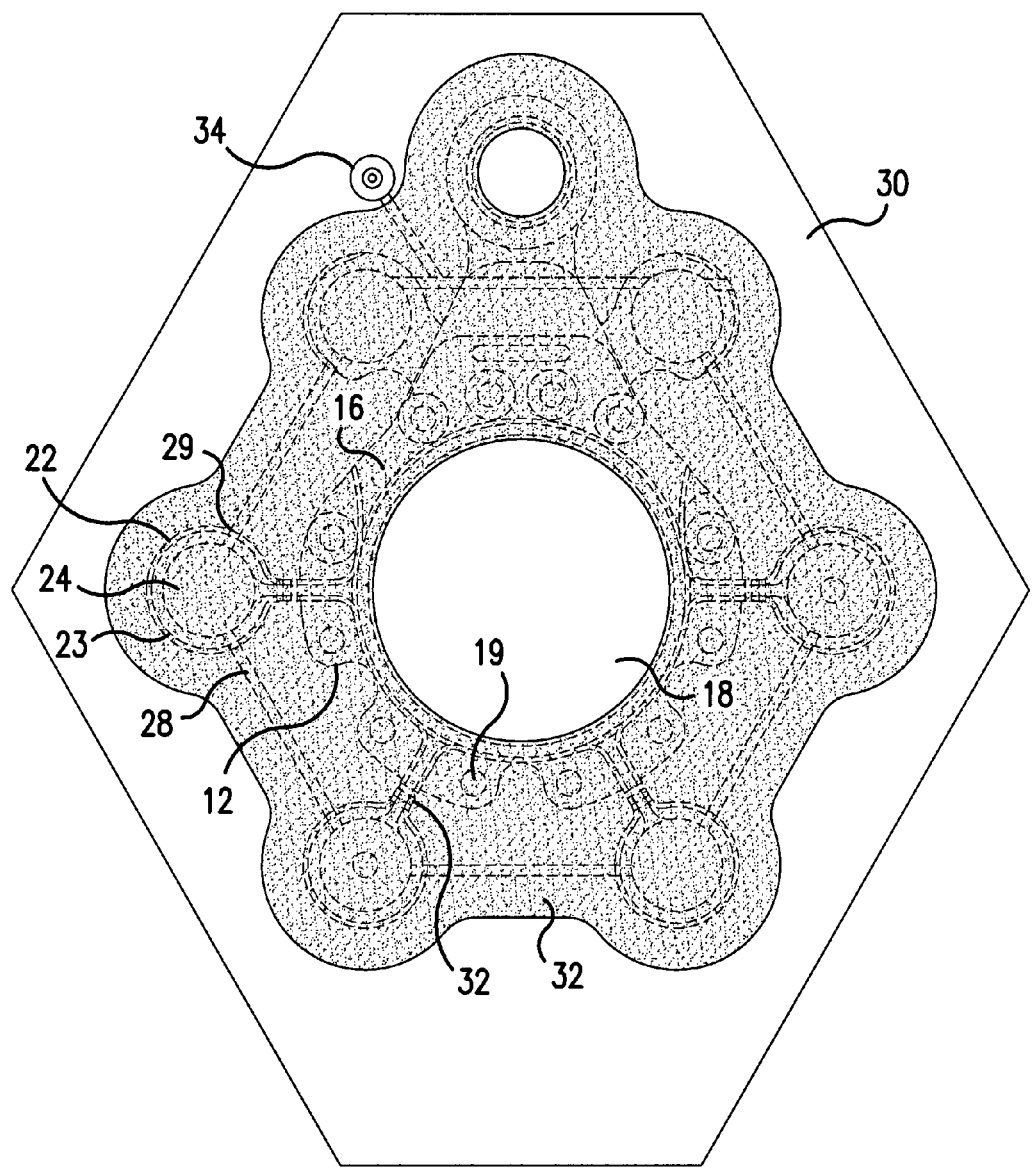
FIG. 6 schematically illustrates the frame of FIG. 2 positioned in a mold and covered with reinforcing fibers and resin during a molding process.
Figure 7:
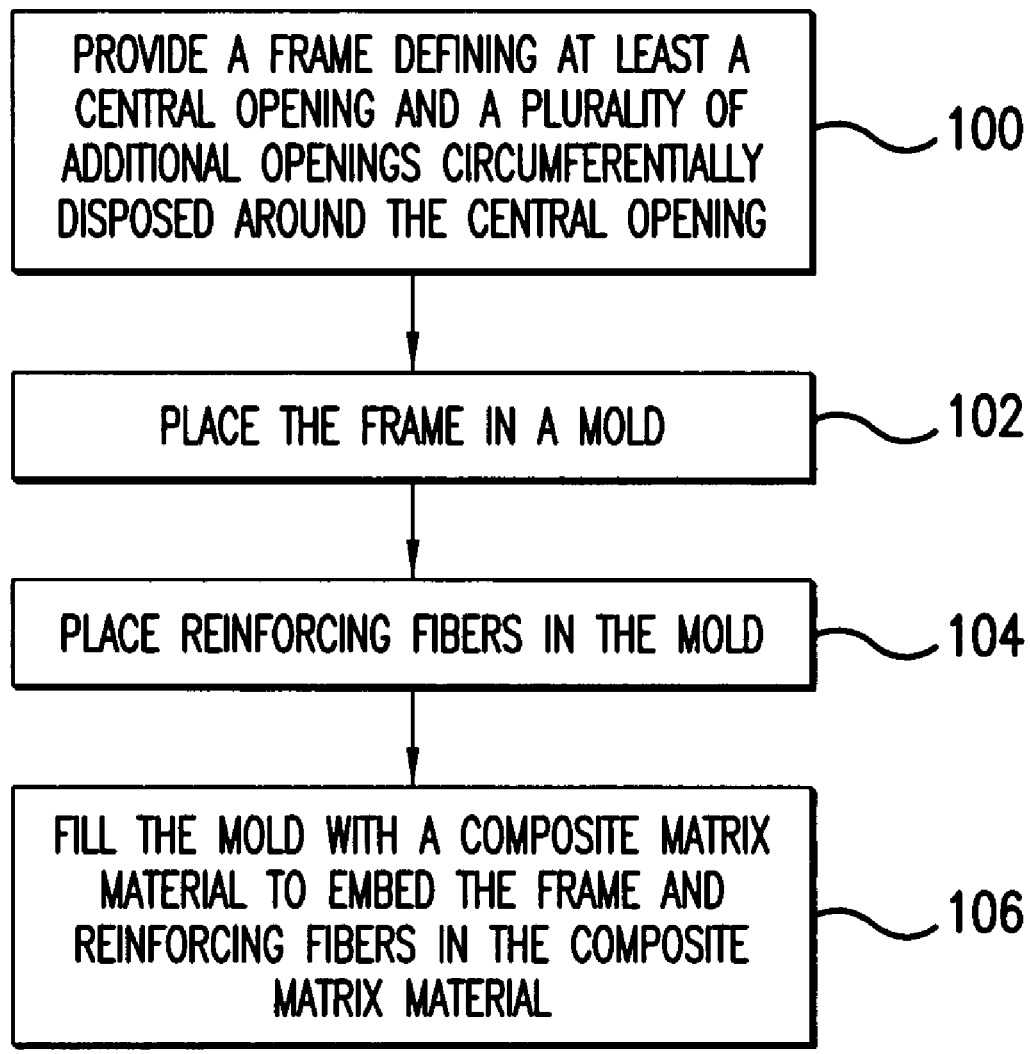
FIG. 7 is a flow chart illustrating a method according to an embodiment of the present invention.
Figure 8:
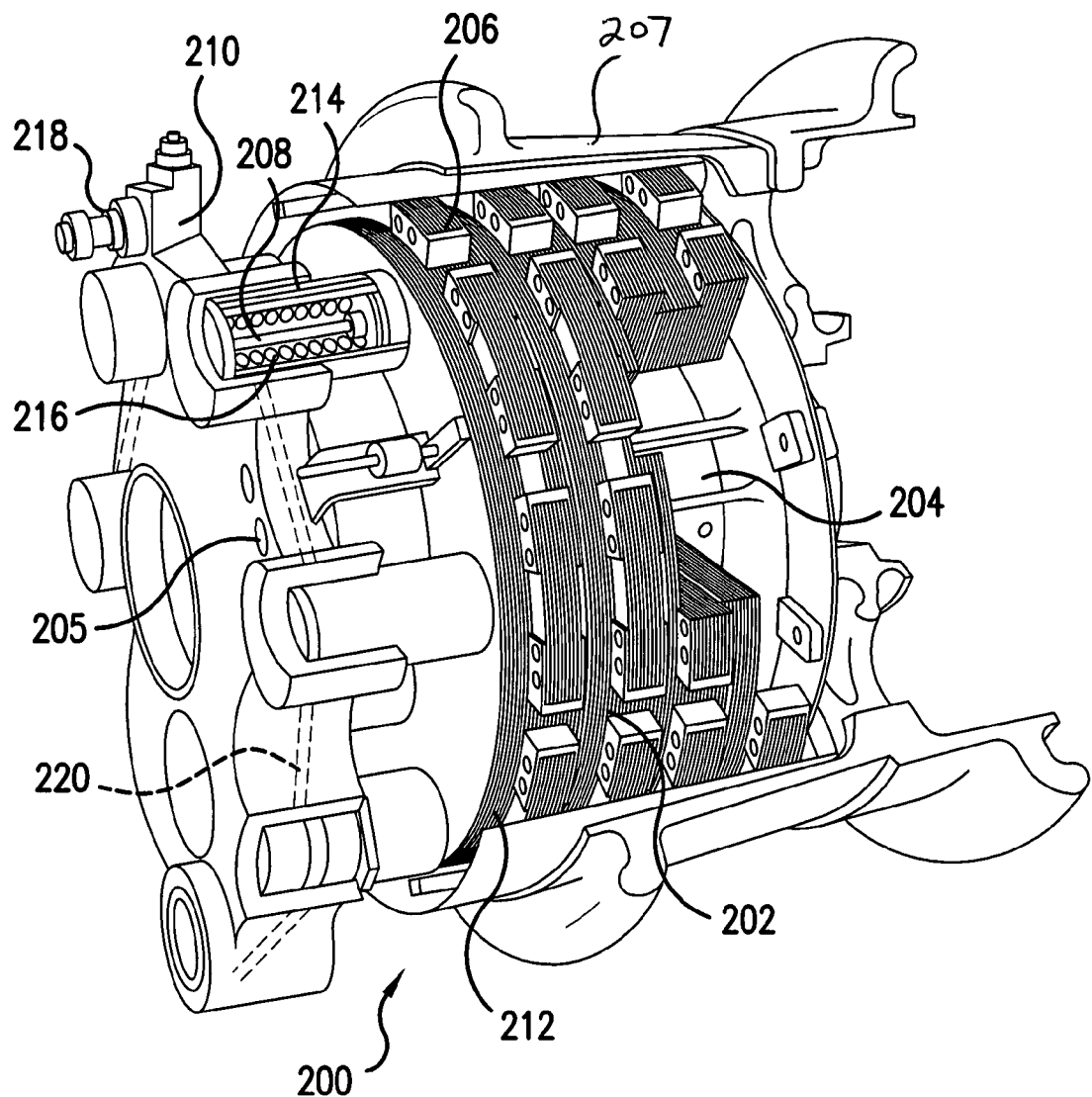
FIG. 8 is a perspective view of a portion of an aircraft brake having a conventional brake piston housing.

FIG. 6 illustrates a mold 30 into which frame 12 is placed during the process of forming brake piston housing 10. A method according to an embodiment of the present invention includes a step 100 of providing a frame such as frame 12 and a step 102 of placing the frame 12 into the mold 30. Reinforcing fibers 32 are added to mold 30 at a step 104. These fibers may be loosely placed into the spaces surrounding arms 20 and central body portion 10 as illustrated in portions of FIG. 5 or, as illustrated in FIGS. 5 and 6, some or all elements of frame 12 and cylindrical inserts 24 may first be wound with one or more fibers 32 which may improve the mechanical bond between composite body 10 and frame 12. After the fibers are in place, the mold is closed with a second mold element (not shown) and a suitable resin, such as, without limitation, a polymer resin, is poured or injected into the mold and cured or allowed to cure in a well known manner at a step 106. Other methods of forming a composite body around frame 12, such as the method of combustion synthesis described in co-pending U.S. patent application Ser. No. 11/583,922, entitled "Carbon Filament Ignition Of Combustion Synthesis Materials" (the entire contents of which are hereby incorporated by reference) could also be used without exceeding the scope of embodiments of the present invention. Frame 12, cylindrical inserts 24 and hydraulic fluid lines 28 are illustrated in dashed lines in FIG. 1 embedded in the composite material that forms body 14.

The completed brake piston housing will be mounted on a torque tube similar to torque tube 204 illustrated in FIG. 6, by passing bolts (not shown) through bolt holes 19 in frame 12 and into the torque tube, and an aircraft brake system that includes brake piston housing 10 will be operated in substantially the same manner as a system that includes an aluminum brake piston housing. However, because body 14 is formed from a composite material and is lighter than a conventional brake piston housing, a significant weight savings is realized. The composite material should also provide a brake piston housing substantially stronger and longer lasting than conventional brake piston housings.

Moreover, cylindrical inserts 24 and hydraulic fluid lines 28 are formed from metal and can therefore withstand the heat and pressures to which the brakes are subjected. In addition, frame 12 provides structural support and maintains cylindrical inserts 24 in a proper orientation in mold 30 during the molding process. Additionally, the physical connection between cylindrical inserts 24 and rings 22 helps maintain a secure connection between the cylindrical inserts 24 and the composite material that forms body 14 because stresses imparted on the inserts 24 during brake use are partially transmitted to the metal frame 12 instead of entirely to the composite body 14. Beneficially, substantially all metal parts are encapsulated with the composite material of body 14 which reduces the potential for corrosion. In addition, it is believed that body 14 formed from composite material will be stiffer than aluminum and thus flex less when forces are applied thereto when the brake pistons are extended. In conventional brake piston housings, such flexing can misalign conventional pistons and may lead to hydraulic fluid leakage and/or damage to the brake pistons or undesired excessive compliance of the brake system.

The present invention has been described herein in terms of preferred embodiments. Obvious modifications and additions to these embodiments will become apparent to those skilled in the relevant arts upon a reading of the foregoing disclosure. It is intended that all such obvious modifications and additions form a part of this invention to the extent they fall within the scope of the several claims appended hereto.

What is claimed is:

1. An aircraft brake piston housing comprising:
    a composite body comprising a plurality of fibers embedded in a matrix, said body including a central bore and a plurality of circumferentially disposed openings surrounding said bore, at least some of said circumferentially disposed openings being configured to receive a brake piston; and
    a frame embedded in said composite body and formed from a material different than said matrix.

2. The aircraft brake piston housing of claim 1 wherein said matrix comprises an epoxy or phenolic resin and said fibers comprise carbon, titanium or nylon-66.

3. The aircraft brake piston housing of claim 1 including at least one brake piston mounted in at least one of said plurality of circumferentially disposed openings.

4. The aircraft brake piston housing of claim 2 wherein said frame comprises a metal frame.

5. The aircraft brake piston housing of claim 4 wherein a portion of said metal frame encircles at least one of said plurality of circumferentially disposed openings.

6. The aircraft brake piston housing of claim 1 wherein said frame comprises a central body member and a plurality of arms extending from said central body member, at least some of said plurality of arms including a ring encircling one of said plurality of circumferentially disposed openings.

7. The aircraft brake piston housing of claim 6 wherein the ring of at least one of said arms has a threaded inner surface and including a cylindrical insert formed of a material different than said matrix and having a threaded outer surface in said ring.

8. The aircraft brake piston housing of claim 7 including a brake piston mounted in said cylindrical insert.

9. The aircraft brake piston housing of claim 7 wherein said at least one arm comprises a first arm and a second arm and including a first cylindrical insert mounted in the ring of said first arm and a second cylindrical insert mounted in the ring of said second arm and a conduit connecting said first arm cylindrical insert and said second arm cylindrical insert.

10. The aircraft brake piston housing of claim 1 wherein said matrix comprises an polymer resin, said frame comprises an aluminum frame having a central body member and a plurality of arms extending from said central body member, at least some of said plurality of arms including a ring encircling one of said plurality of circumferentially disposed openings, wherein said epoxy resin surrounds and supports said plurality of arms.

11. The aircraft brake piston housing of claim 1 wherein said frame comprises a first cylindrical insert in a first one of said plurality of circumferentially disposed openings, a second cylindrical insert in a second one of said plurality of circumferentially disposed openings and a conduit connecting said first and second cylindrical inserts.

12. A method of forming an aircraft brake piston housing comprising the steps of:
   providing a frame defining at least a central opening and a plurality of additional openings circumferentially disposed around the central opening;
   placing the frame in a mold;
   placing reinforcing fibers in the mold; and
   filling the mold with a composite matrix material to embed the frame and reinforcing fibers in the composite matrix material.

13. The method of claim 12 wherein said step of providing a frame comprises the step of providing a frame having a central body member defining the central opening, a plurality of ring members surrounding at least some of the plurality of additional openings, and a plurality of arms connecting the central body member and the plurality of ring members and wherein said step of placing reinforcing fibers in the mold comprises the step of placing reinforcing fibers between adjacent pairs of the plurality of arms.

14. The method of claim 12 wherein said step of providing a frame comprises the step of providing a frame having a central body member defining the central opening, a plurality of ring members surrounding at least some of the plurality of additional openings, and a plurality of arms connecting the central body member and the plurality of ring members and wherein said step of placing reinforcing fibers in the mold comprises the step of wrapping at least some of the arms with reinforcing fibers.

15. The method of claim 13 including the additional step of mounting cylindrical inserts in at least some of the ring members.

16. The method of claim 14 including the additional steps of mounting cylindrical inserts in at least some of the ring members and at least partially wrapping the cylindrical inserts with the reinforcing fibers.

17. The method of claim 16 including the additional step of mounting a brake piston in at least one of the cylindrical inserts.

18. The method of claim 15 including the additional step of connecting at least first and second ones of the cylindrical inserts with a conduit.

19. An aircraft brake piston housing comprising:
   a composite body comprising a plurality of fibers embedded in a matrix, said body including a central bore and a plurality of circumferentially disposed openings surrounding said bore, a first brake piston in a first one of said circumferentially disposed openings and a second brake piston in a second one of said plurality of circumferentially disposed openings; and
   a frame embedded in said composite body and formed from a material different than said matrix.

20. The aircraft brake piston housing of claim 19 including at least one conduit in said composite body connecting the first brake piston to the second brake piston.

* * * * *